(12) United States Patent
Guerrera (10) Patent No.: US 6,466,459 B2
(45) Date of Patent: Oct. 15, 2002

(54) PASSIVE VOLTAGE CLAMP FOR RECTIFIER DIODES IN A SOFT-SWITCHING DC/DC CONVERTER

(75) Inventor: Nunzio Guerrera, Quebec (CA)

(73) Assignee: Adtec International Ltd., Kwun Tong (HK)

( * ) Notice: Subject to any disclaimer, the term of this patent is extended or adjusted under 35 U.S.C. 154(b) by 0 days.

(21) Appl. No.: 09/798,186

(22) Filed: Mar. 1, 2001

(65) Prior Publication Data

US 2002/0122318 A1 Sep. 5, 2002

(51) Int. Cl.[7] .............................................. H02M 3/335
(52) U.S. Cl. ........................................................ 363/17
(58) Field of Search ................................. 363/170, 132, 363/98, 131, 56.02; 323/207, 219, 217, 215

(56) References Cited

U.S. PATENT DOCUMENTS

| | | | |
|---|---|---|---|
| 5,119,283 A | * | 6/1992 | Steigerwald et al. .......... 363/37 |
| 5,198,969 A | | 3/1993 | Redl et al. |
| 6,246,599 B1 | * | 6/2001 | Jang et al. .................. 363/132 |

* cited by examiner

*Primary Examiner*—Shawn Riley
(74) *Attorney, Agent, or Firm*—Coudert Brothers LLP (57) ABSTRACT

An apparatus for clamping the voltage across rectifier diodes in a soft-switching DC/DC converter, wherein the clamping action is created by an additional winding coupled to the primary winding of the converter's transformer. This additional winding has fewer turns than the primary winding, is also coupled to the clamping diodes and effectively clamps the voltage across the rectifier diodes by transformer action. One preferred embodiment of the invention is for use with a full bridge converter. Another preferred embodiment is for use with a two switch forward converter.

7 Claims, 6 Drawing Sheets

PASSIVE VOLTAGE CLAMP FOR RECTIFIER DIODES IN A SOFT-SWITCHING DC/DC CONVERTER

FIELD OF INVENTION

This invention relates generally to soft-switching DC/DC converters and specifically to apparatus for clamping the voltage across rectifier diodes in a soft-switching DC/DC converter.

BACKGROUND OF THE INVENTION

Figure 1:
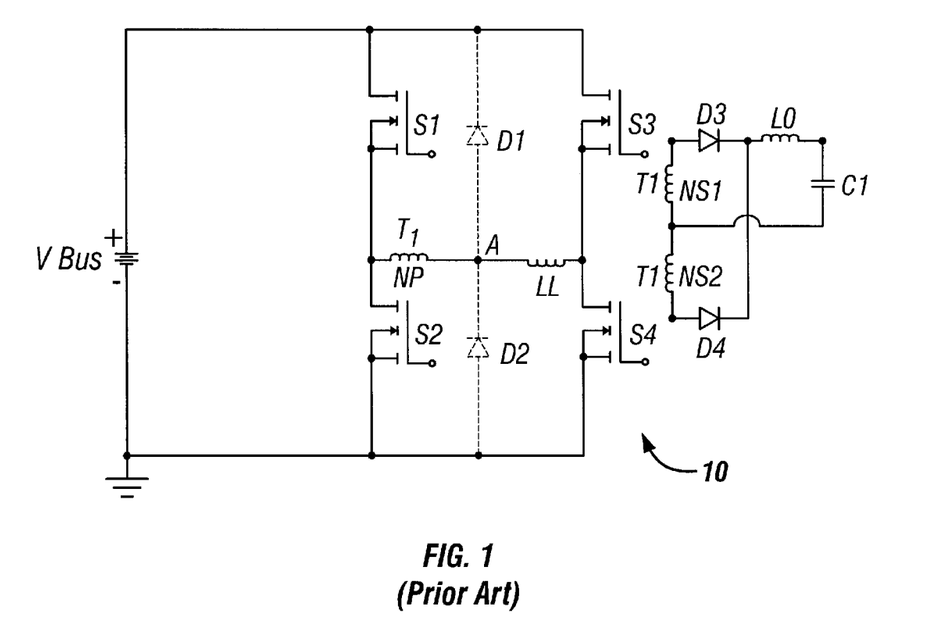
FIG. 1 shows a prior art phase-shifted bridge converter.

FIG. 1 illustrates a prior art phase shifted bridge DC/DC converter 10 comprised of semiconductor switching devices ("switches") S1, S2, S3, and S4, transformer T1 with primary winding NP and secondary windings NS1 and NS2, resonant inductor LL, rectifier diodes D3 and D4, inductor Lo, and an output capacitor C1. Zero voltage turn on for switches S1 and S2 is achieved by using the energy stored in Lo to discharge the capacitance's of switches S1 and S2 prior to their being turned on. This is the modulated leg of the phase shift bridge. The drive signal to these switches follows the pulse width modulated (PWM) signal of the control circuit.

One known method of achieving zero voltage turn on for switches S3 and S4 is by using the energy stored in resonant inductor LL to discharge the capacitance's of switches S3 and S4 prior to their being turned on. This is the fixed leg of the phase shift bridge. A secondary function of inductor LL is to control the rate of change of the current ("di/dt") in the rectifier diodes, reducing their recovery current. By reducing the di/dt in these diodes, electromagnetic interference ("EMI") emissions are also reduced. Inductor LL always needs to be larger than the leakage inductance of transformer T1. The value of inductor LL is preferably determined by the desired power level of the product or the particular circuit application. For instance, for a three (3) kilowatt power converter, resonant inductor LL may need to be between five (5) to ten (10) microH. For a power level of five hundred (500) watts, inductor LL should be in the range of twenty (20) or thirty (30) microH.

Figure 2:
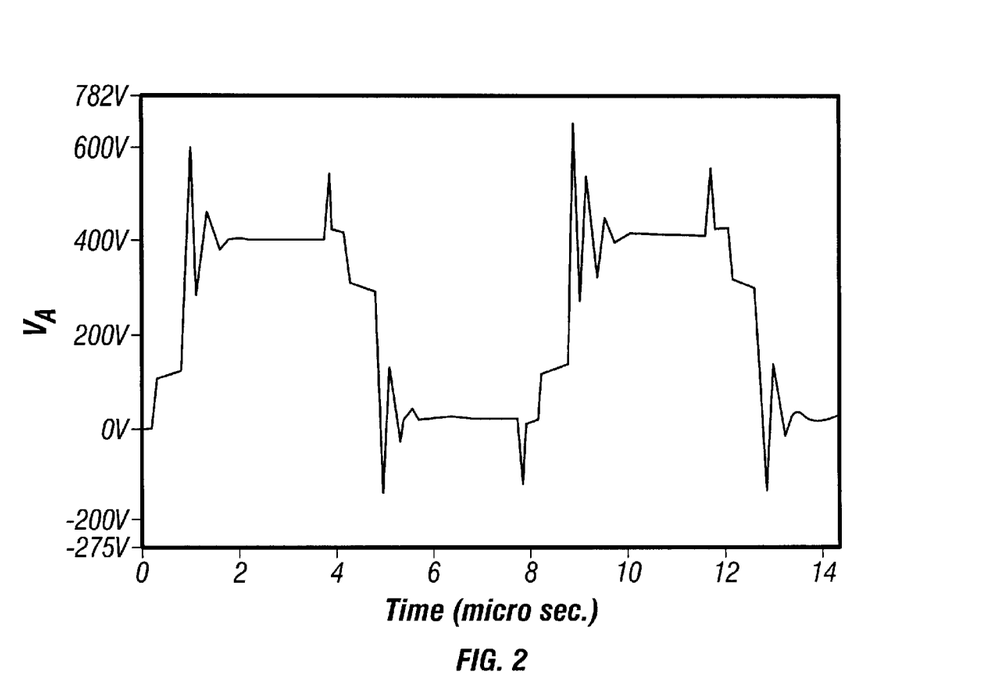
FIG. 2 shows the prior art voltage waveform at node A.
Figure 3:
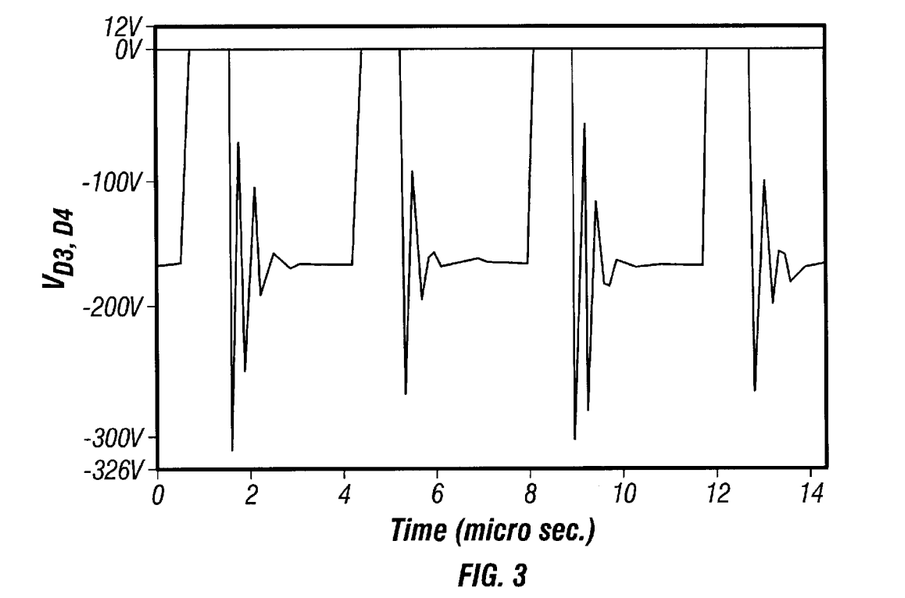
FIG. 3 shows the prior art voltage waveform across diodes D3 and D4.

The problem with using a linear inductor LL in series with the transformer primary is that, when switches S3 or S4 turn off, the current in resonant inductor LL is interrupted. This causes the voltage at node A in FIG. 1 to have voltage overshoots ("spikes") above VBUS or below ground, depending on the polarity of the current in inductor LL when switch S3 or S4 turns off. This is illustrated in the voltage waveform shown in FIG. 2. The energy stored in the leakage inductance of the transformer increases the magnitude of these voltage spikes. The voltage spikes are reflected to the secondary of transformer T1 and result in voltage spikes across rectifier diodes D3 an D4 when they are not conducting. See the voltage waveform shown in FIG. 3. The magnitude of the voltage spikes across diodes D3 and D4 could exceed the diode breakdown voltage for these diodes, causing diodes D3 and D4 to fail. Prior art methods for eliminating voltage spikes on D3 and D4 have included saturable reactors, RC snubbers, or complicated active clamps.

One current method used to clamp the voltage across diodes D3 and D4 is to connect a first clamping diode between node A and VBUS and a second clamping diode between node A and ground, as shown in phantom in FIG. 1 at D1 and D2. The problem with this topology is that it creates a large forward current and large reverse recovery currents in clamping diodes D1 and D2, which results in substantial power dissipation in these diodes. This prior art solution is disclosed in the Red1, et al. patent, U.S. Pat. No. 5,198,969 (hereafter "Red1, et al."). The topology in Red1, et al. is also effective only at lower frequencies. At narrow duty cycles and frequencies greater than 200 kHz, the clamping diodes used by Red1, et al. suffer from unacceptable reverse recovery losses.

In an article in Intelec 93, entitled: Switch Transitions in the Soft Switching Full-Bridge PWM Phase Shift DC/DC Converter: Analysis and Improvements, Red1 identified these problems of his circuit and proposed the solution of adding a resistor between the clamp diodes and the resonant inductor to discharge the resonant inductor more quickly. However, at high power levels and high frequency, this method creates unwanted dissipation of energy across the resistor.

What is needed is a simpler and more efficient mechanism for clamping the voltage across the rectifier diodes and eliminating rectifier diode failure in a soft-switching converter, while simultaneously minimizing power loss in the converter.

SUMMARY OF THE INVENTION

The present invention comprises an apparatus for clamping the voltage across rectifier diodes in a soft-switching DC/DC converter. The DC/DC converter includes a positive and negative input voltage terminal intercoupled by a plurality of semiconductor switching devices, a transformer, a resonant inductor coupled in series with a primary winding of the transformer, and rectifier diodes coupled to a secondary winding of the transformer. The apparatus for clamping the voltage across the rectifier diodes comprises first and second clamp diodes connected in series across the positive and negative input voltage terminals and an additional winding added to the transformer that has fewer turns than the primary winding of the transformer. The additional winding is coupled between the primary winding of the transformer and the junction of the first and second clamp diodes. One preferred embodiment of the present invention is for use with a full bridge converter. Another preferred embodiment of the present invention is for use with a two switch forward converter.

BRIEF DESCRIPTION OF THE DRAWINGS

The forgoing aspects and the attendant advantages of the present invention will become more readily appreciated by reference to the following detailed description, when taken in conjunction with the accompanying drawings, wherein.

DETAILED DESCRIPTION OF THE INVENTION

Figure 4:
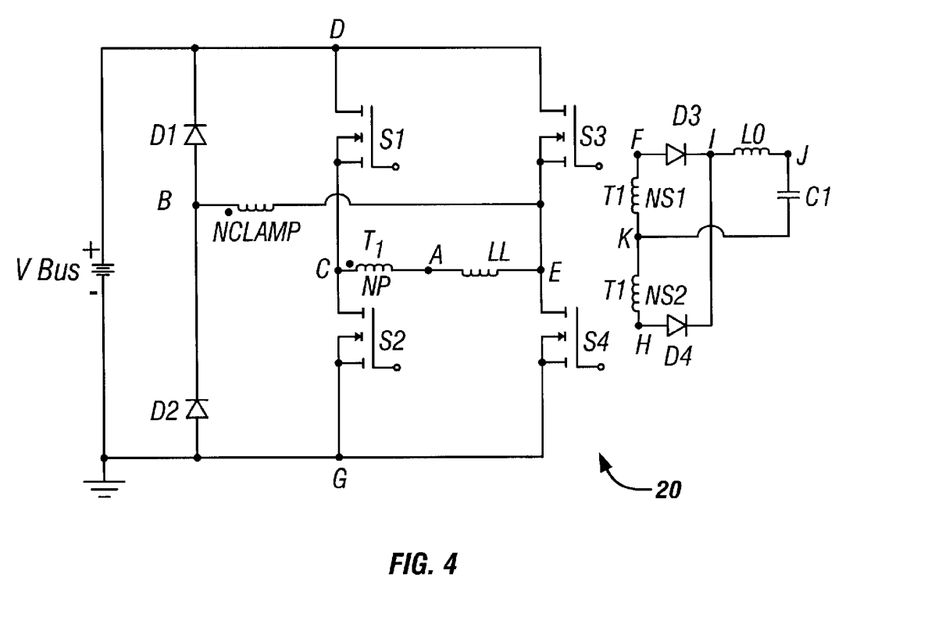
FIG. 4 shows the preferred embodiment of the invention as applied to a phase-shifted bridge converter.

The present invention comprises an apparatus for limiting ("clamping") the voltage across rectifier diodes in a soft-switching DC/DC converter. FIG. 4 shows the preferred embodiment of the invention as applied to a phase-shifted bridge converter 20.

Converter 20 is connected to a power supply VBUS between node D, a positive input voltage terminal, and ground (node G), a negative input voltage terminal. Converter 20 includes four switching devices ("switches") S1, S2, S3, and S4, which are preferably metal-oxide semiconductor field effect transistors. Switches S1 and S2 are connected in series between node D and node G with their junction at node C. Switches S3 and S4 are connected in series between node D and node G with their junction at node E. Converter 20 also includes a transformer T1 that has a primary winding NP connected between node C and node A, a secondary winding NS1 connected between node F and node K, and a secondary winding NS2 connected between node K and node H. A resonant inductor LL, with an inductance greater than the leakage inductance of transformer T1, is connected in series with winding NP, between node A and node E. Two rectifier diodes D3 and D4 are included on the secondary side of transformer T1, with diode D3 connected between node F and node I and diode D4 connected between node H and node I. inductor Lo is connected between node I and node J and an output capacitor C1 is connected between node J and node K.

As seen in FIG. 4, the clamping function according to the present invention is performed by clamping diodes D1 and D2 and another winding of transformer T1 identified as NCLAMP. Diodes D1 and D2 are connected in series between node D and node G with the junction at node B. Diodes D1 and D2 clamp the voltage at node B, preventing the voltage at node B from rising above VBUS or falling below ground.

Figure 5:
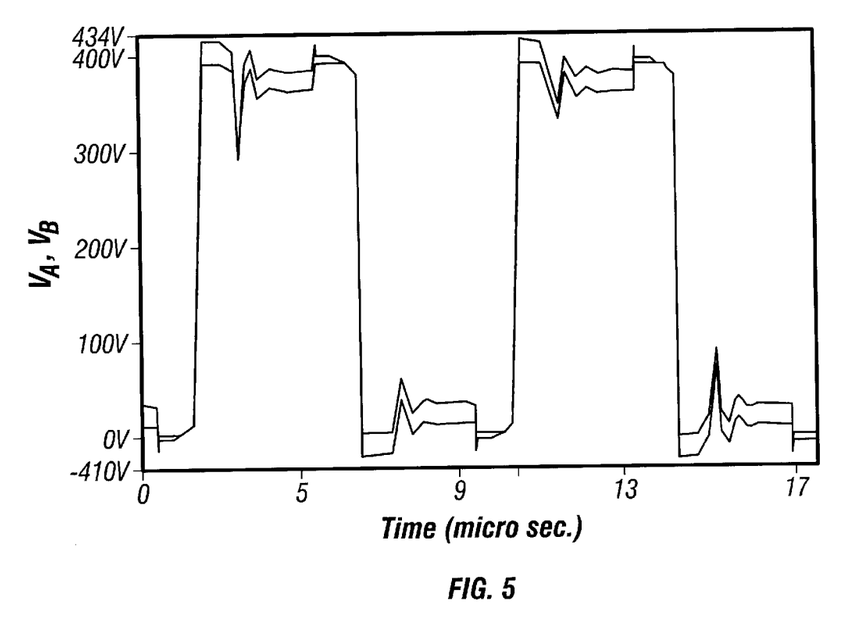
FIG. 5 shows the voltage waveform at node A and node B of converter 20, according to the present invention.
Figure 6:
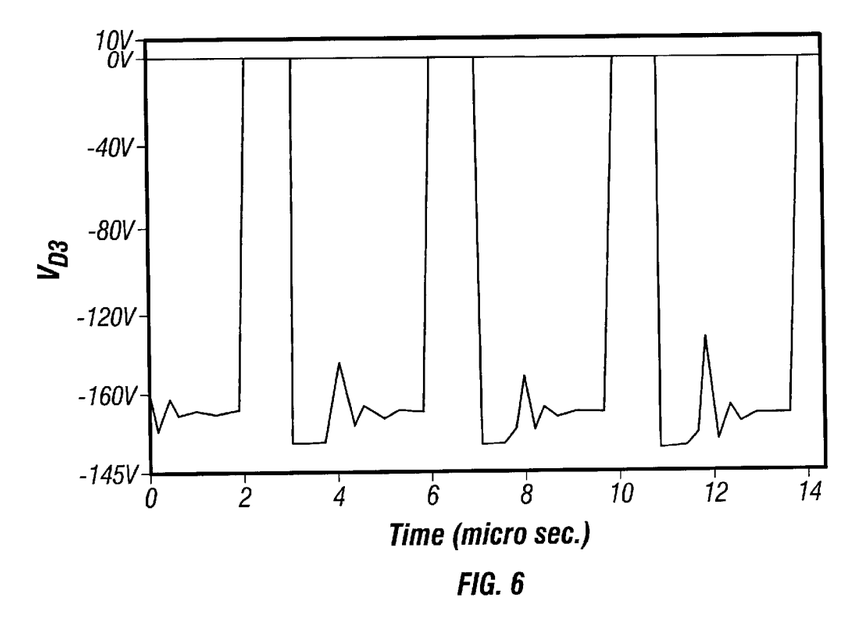
FIG. 6 shows the voltage waveform across diode D3 of converter 20, according to the present invention.

Winding NCLAMP is an additional winding that is added to transformer T1. Connecting NCLAMP between the primary winding NP of transformer T1 and the junction of clamping diodes D1 and D2 causes the voltage at node B to be reflected to node A by transformer action, as seen in the waveforms shown in FIG. 5. The result is that there is no substantial voltage overshoot either above VBUS or below ground at node A, thereby eliminating the undesirable voltage spikes on diodes D3 and D4, as shown in FIG. 6. In other words, with clamp winding NCLAMP magnetically coupled to the secondary windings of transformer T1, the energy stored in resonant inductor LL, as well as some of the leakage inductance energy, is clamped by this winding.

Figure 7:
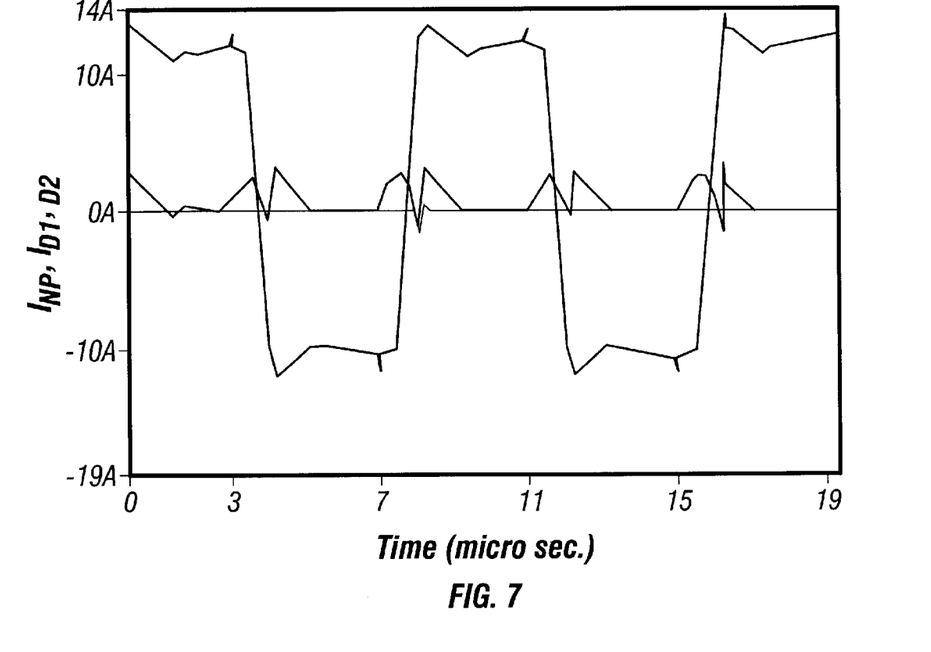
FIG. 7 shows the current waveform in the primary winding of T1 and the current waveform in diodes D1 and D2 of converter 20, according to the present invention.

The ratio "n" of the number of turns given to winding NCLAMP with respect to the number of turns in primary winding NP is preferably always less than one. Establishing a ratio of less than one results in only small forward currents in the transformer primary and essentially no reverse recovery current in diodes D1 and D2, as shown in FIG. 7. The circuit according to the present invention thus discharges the resonant inductor LL quickly by applying a voltage across it that is determined by the turns ratio between the clamp winding NCLAMP and the primary winding NP. This eliminates the need for a dissipative resistor as suggested by Red1.

The value of "n" depends upon the particular application. However, "n" is determined primarily by the breakdown voltage of diodes D3 and D4, and in general, winding NCLAMP only has slightly fewer turns than winding NP. For instance, where VBUS=400V with a power level of 3000 W and rectifier diode breakdown voltages of between 250V and 300V, winding NCLAMP is preferably about three fewer turns than winding NP. Thus, where winding NP is 20 turns, winding NCLAMP would be 17 turns, and where winding NP is 40 turns, winding NCLAMP would be 37 turns. In addition, there should be close magnetic coupling between the various windings NP, NCLAMP, NS1, and NS2 to minimize leakage inductance. Lowering the transformer leakage inductance will create better clamping action from winding NCLAMP.

Figure 8:
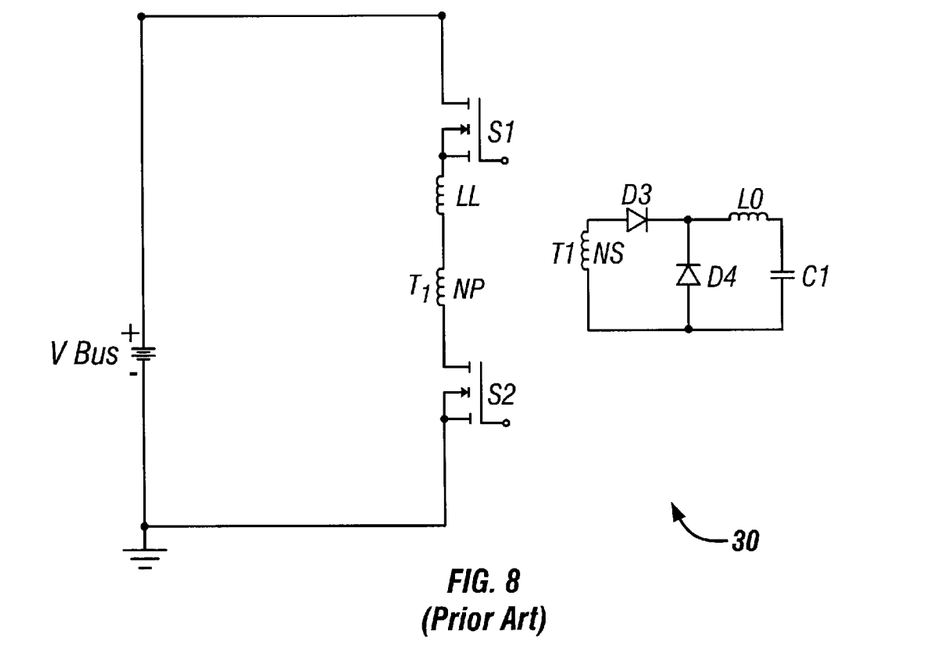
FIG. 8 shows a prior art two switch forward converter.
Figure 9:
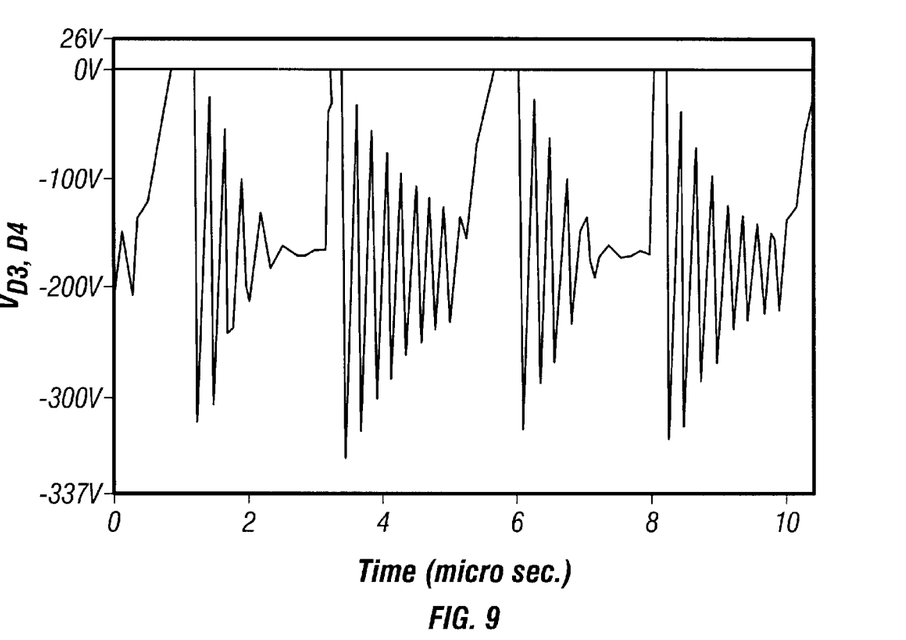
FIG. 9 shows the prior art voltage waveform across diodes D3 and D4.

FIG. 8 shows a prior art two switch forward converter 30. Similar to the prior art bridge converter, there is significant voltage spiking across rectifier diodes D3 and D4 of converter 30, as seen in FIG. 9.

Figure 10:
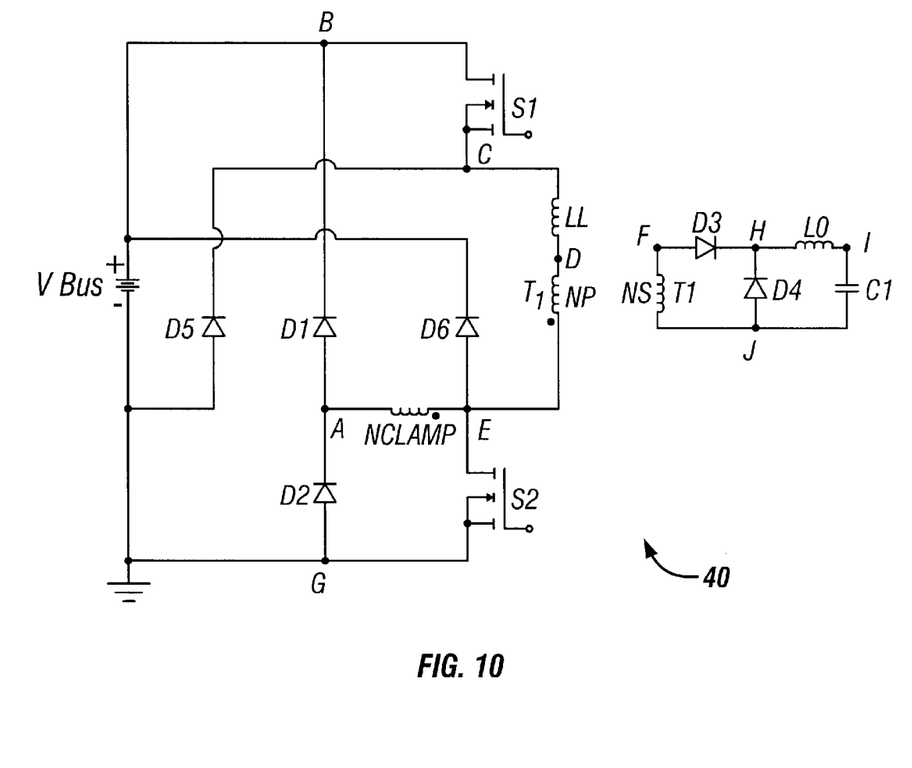
FIG. 10 shows another embodiment of the invention as applied to a two-switch forward converter.

FIG. 10 shows another embodiment of the invention as applied to a two switch forward converter 40. Converter 40 is connected to power supply VBUS at node B and ground (node G). Converter 40 includes two switching devices S1 and S2 which are preferably metal-oxide semiconductor field effect transistors, Switch S1 is connected between node B and node C and Switch S2 is connected between node E and node G. Converter 40 also includes a transformer T1 that has a primary winding NP connected between node D and node E and a secondary winding NS connected between node F and node J. Diode D5 is connected between node C and node G and diode D6 is connected between node B and node E, and provide a path to reset transformer T1 when the two FET switches S1 and S2 are turned off. A resonant inductor LL is connected in series between switch S1 and winding NP. Two rectifier diodes D3 and D4 are included on the secondary side of transformer T1, with diode D3 connected between node F and node H and diode D4 connected between node H and node J. An inductor Lo is connected between node I and node H, and an output capacitor C1 is connected between node J and node I.

Figure 11:
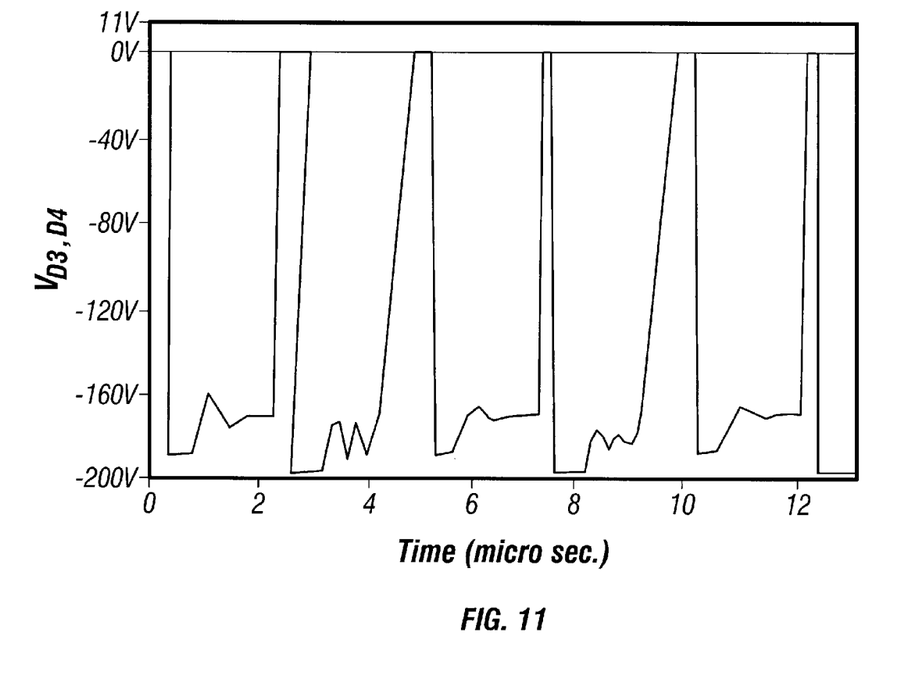
FIG. 11 shows the voltage waveform across diodes D3 and D4 of converter 40, according to the present invention.

Winding NCLAMP in conjunction with clamping diodes D1 and D2 effectively clamp the voltage across diodes D3 and D4 of converter 40, as shown in FIG. 11. Diodes D1 and D2 are connected in series between node B and node G with the junction at node A. Diodes D1 and D2 clamp the voltage at node A, preventing the voltage at node A from rising above VBUS or falling below ground. Winding NCLAMP is an additional winding that is added to transformer T1. Winding NCLAMP is connected between primary winding NP of transformer T1, at node E, and the junction of clamping diodes D1 and D2. It causes the voltage at node A to be reflected across rectifier diodes D3 and D4 by transformer action, as seen in the waveform shown in FIG. 11. Since there is no substantial voltage overshoot either above VBUS or below ground at node A, the voltage spikes on diodes D3 and D4 are eliminated.

The embodiments of the apparatus described above are illustrative of the principles of the present invention and are not intended to limit the invention to the particular embodiments described. Other embodiments of the present invention can be adapted for use in a soft-switching DC/DC converter environment. Accordingly, while the preferred embodiment of the invention has been illustrated and described, it will be appreciated that various changes can be made therein without departing from the spirit and scope of the invention.

What is claimed is:

1. In a soft-switching DC/DC converter including a positive and a negative voltage input terminal intercoupled by a plurality of semiconductor switching devices, a transformer, a resonant inductor coupled in series with a primary winding of said transformer, and rectifier diodes coupled to a secondary winding of the transformer, an apparatus for clamping the voltage across said rectifier diodes comprising:

first and second clamp diodes connected in series across said positive and negative voltage input terminals; and an additional winding of said transformer coupled between said primary winding of said transformer and the junction of said first and second clamp diodes, said additional winding comprising fewer turns than said primary winding of said transformer.

2. The apparatus of claim 1, wherein said converter is a phase shifted bridge converter, said bridge converter comprising:

first, second, third and fourth switches, wherein said first and second switches are connected in series between said positive input terminal at a first node and said negative voltage input terminal at ground with a junction at a second node, and said third and fourth switches are connected in series between said first node and ground with a junction at a third node;

a transformer having a primary winding and first and second secondary windings, wherein said primary winding is connected between said second node and a fourth node, wherein said first secondary winding is connected between a fifth node and a sixth node, and wherein said second secondary winding is connected between said sixth node and a seventh node;

a resonant inductor with an inductance greater than a leakage inductance of said transformer, connected in series between said primary winding and said junction of said third and fourth switches;

first and second rectifier diodes, wherein said first rectifier diode is connected between said fifth node and a ninth node and said second rectifier diode is connected between said ninth node and said seventh node;

an inductor connected between said ninth node and an eighth node; and an output capacitor connected between said eighth node and said sixth node.

3. The apparatus of claim 1, wherein each said switch is a metal-oxide semiconductor field effect transistor.

4. The apparatus of claim 1, wherein said converter is a two switch forward converter, said forward converter comprising:

first and second switches, wherein said first switch is connected between said positive voltage input terminal at a first node and a second node, and said second switch is connected between a third node and said negative voltage input terminal at ground;

a transformer with a primary winding and a secondary winding, wherein said primary winding is connected between said third node and a fourth node and said secondary winding is connected between a fifth node and a sixth node;

a resonant inductor, with an inductance greater than a leakage inductance of said transformer, connected between said primary winding and said second node;

first and second rectifier diodes, wherein said first rectifier diode is connected between said fifth node and a seventh node and said second rectifier diode is connected between said seventh node and said sixth node;

an inductor connected between said seventh node and an eighth node; and an output capacitor connected between said sixth node and said eighth node.

5. The apparatus of claim 4, wherein each said switch is a metal-oxide semiconductor field effect transistor.

6. In a soft-switching DC/DC phase shifted bridge converter comprising a positive and a negative voltage input terminal; first, second, third and fourth switches, wherein said first and second switches are connected in series between said positive voltage input terminal at a first node and said negative voltage input terminal at ground with a junction at a second node, and said third and fourth switches are connected in series between said first node and ground with a junction at a third node; a transformer having a primary winding and first and second secondary windings, wherein said primary winding is connected between said second node and a fourth node, wherein said first secondary winding is connected between a fifth node and a sixth node, and wherein said second secondary winding is connected between said sixth node and a seventh node; a resonant inductor with an inductance greater than a leakage inductance of said transformer, connected in series between said primary winding and said junction of said third and fourth switches; first and second rectifier diodes, wherein said first rectifier diode is connected between said fifth node and a ninth node and said second rectifier diode is connected between said ninth node and said seventh node; an inductor connected between said ninth node and an eighth node; and an output capacitor connected between said eighth node and said sixth node, an apparatus for clamping the voltage across said first and second rectifier diodes comprising:

first and second clamp diodes connected in series across said positive and negative voltage input terminals; and an additional winding of said transformer coupled between said primary winding of said transformer and a junction of said first and second clamp diodes, said additional winding comprising fewer turns than said primary winding of said transformer.

7. In a soft-switching DC/DC two switch forward converter comprising a positive and a negative voltage input terminal; first and second switches, wherein said first switch is connected between said positive voltage input terminal at a first node and a second node, and said second switch is connected between a third node and said negative voltage input terminal at ground; a transformer with a primary winding and a secondary winding, wherein said primary winding is connected between said third node and a fourth node and said secondary winding is connected between a fifth node and a sixth node; a resonant inductor, with an inductance greater than a leakage inductance of said transformer, connected between said primary winding and said second node; first and second rectifier diodes, wherein said first rectifier diode is connected between said fifth node and a seventh node and said second rectifier diode is connected between said seventh node and said sixth node; an inductor connected between said seventh node and an eighth node; and an output capacitor connected between said sixth node and said eighth node, an apparatus for clamping the voltage across said first and second rectifier diodes comprising:

first and second clamp diodes connected in series across said positive and negative voltage input terminals; and an additional winding of said transformer coupled between said primary winding of said transformer and a junction of said first and second clamp diodes, said additional winding comprising fewer turns than said primary winding of said transformer.

* * * * *

UNITED STATES PATENT AND TRADEMARK OFFICE
CERTIFICATE OF CORRECTION

PATENT NO.   : 6,466,459 B2
DATED        : October 15, 2002
INVENTOR(S)  : Nunzio Guerrera It is certified that error appears in the above-identified patent and that said Letters Patent is hereby corrected as shown below:

<u>Title page,</u>
Item [73], Assignee, should read as follows
    -- Astec International Ltd.
       Kwun Tong (HK) --

<u>Column 5,</u>
Line 21, "positive input" should read -- positive voltage input --

Signed and Sealed this

First Day of April, 2003

JAMES E. ROGAN
*Director of the United States Patent and Trademark Office*